United States Patent
Choi et al.

(10) Patent No.: US 7,558,293 B2
(45) Date of Patent: Jul. 7, 2009

(54) METHOD FOR DETECTING INITIAL OPERATION MODE IN WIRELESS COMMUNICATION SYSTEM EMPLOYING OFDMA SCHEME

(75) Inventors: Seung-Hoon Choi, Suwon-si (KR);
Sung-Eun Park, Suwon-si (KR);
Jae-Yoel Kim, Gunpo-si (KR);
Dong-Seek Park, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 641 days.

(21) Appl. No.: 11/213,518

(22) Filed: Aug. 26, 2005

(65) Prior Publication Data

US 2006/0045003 A1  Mar. 2, 2006

(30) Foreign Application Priority Data

Aug. 26, 2004  (KR) .................. 10-2004-0067646

(51) Int. Cl.
*H04W 4/00* (2009.01)
*H04W 36/00* (2009.01)
*H04J 11/00* (2006.01)
*H04J 3/06* (2006.01)

(52) U.S. Cl. .................. 370/509; 370/328; 370/208; 455/438

(58) Field of Classification Search .................. 370/203, 370/208, 210, 509, 328; 455/438
See application file for complete search history.

(56) References Cited

U.S. PATENT DOCUMENTS

| 6,707,856 | B1 | 3/2004 | Gardner et al. | |
| 7,236,544 | B2 * | 6/2007 | Williams et al. | 375/316 |
| 2003/0112744 | A1 * | 6/2003 | Baum et al. | 370/206 |
| 2003/0193970 | A1 | 10/2003 | Kim et al. | |
| 2004/0136464 | A1 * | 7/2004 | Suh et al. | 375/260 |
| 2005/0013238 | A1 * | 1/2005 | Hansen | 370/203 |

FOREIGN PATENT DOCUMENTS

| DE | 101 47 951 | 3/2003 |
| EP | 1 276 288 | 1/2003 |
| EP | 1 424 789 | 6/2004 |
| RU | 2 214 687 | 10/2003 |
| RU | 2 233 033 | 7/2004 |

OTHER PUBLICATIONS

Jiho Jang et al., Operating mode identification using preamble, Jun. 28, 2004, IEEE C802.16e-04/128, pp. 0-2.*
Hassan Yaghoubi, Scalable OFDMA Physical Layer in IEEE 802.16 WirelessMAN, Intel Technical Journal, Aug. 20, 2004, vol. 08, Issue 03, pp. 201-212.*
Anand Dabak et al., Hierarchical Preamble Design for128, 512 and 1024 point FFT sizes in the OFDMA PHY Layer, Aug. 17, 2004, IEEE C802.16e-04/279r1.*
Carl Eklund et al., "IEEE Standard 802.16: A Technical Overview of the WirelessMAN Air Interface for Broadband Wireless Access", IEEE Communications Magazine, Jun. 2002.
P.K. Gorokhov, "Explanatory Dictionary of Radio and Electrical Engineering", 1993.
Wonil Roh et al., "Enhanced MAC Support for MIMO OFDMA", IEEE 802.16 Broadband Wireless Access Working Group, May 19, 2004.
Israel Koffman et al., "Broadband Wireless Access Solutions Based on OFDM Access in IEEE 802.16", IEEE Communications Magazine, Apr. 2002.
Yuanrun Teng et al., "Grouping Adaptive Modulation Method for Burst Mode OFDM Transmission System", Proceedings of IEEE TENCON'02, Oct. 28-31, 2002.

* cited by examiner

*Primary Examiner*—Hanh Nguyen
(74) *Attorney, Agent, or Firm*—The Farrell Law Firm, LLP

(57) ABSTRACT

Disclosed is a method for detecting an initial operating mode in an OFDMA wireless communication system the method includes receiving from a BS a reference signal having a specific pattern, and detecting an initial operation mode according to the received reference signal.

9 Claims, 2 Drawing Sheets

METHOD FOR DETECTING INITIAL OPERATION MODE IN WIRELESS COMMUNICATION SYSTEM EMPLOYING OFDMA SCHEME

PRIORITY

This application claims priority to an application entitled "Method for Detecting Initial Operation Mode in Wireless Communication System Employing OFDMA Scheme" filed in the Korean Industrial Property Office on Aug. 26, 2004 and assigned Serial No. 2004-67646, the contents of which are hereby incorporated by reference.

BACKGROUND OF THE INVENTION

1. Field of the Invention

The present invention relates to a method for detecting an operating mode in a wireless communication system, and more particularly to a method for detecting an initial operating mode in a wireless communication system employing an Orthogonal Frequency Division Multiple Access (OFDMA) scheme.

2. Description of the Related Art

In general, a wireless communication system is a system for supporting wireless communication services, and includes a Base Station (BS) and a Mobile Station (MS). The BS and the MS communicate with each other by using transmission frames. In order to transmit and receive the transmission frames, the BS and the MS must acquire mutual synchronization. In order to acquire the mutual synchronization, the BS transmits a synchronization signal to the MS to enable the MS to synchronize with the start of the frames transmitted from the BS. Then, the MS receives the synchronization signal transmitted from the BS to confirm the frame timing of the BS and decode received frames according to the confirmed frame timing. A specific preamble sequence, which is communicated between the BS and the MS, is usually used as the synchronization signal.

In a wireless communication system employing an Orthogonal Frequency Division Multiplexing (OFDM) scheme or an OFDMA scheme (that is, an OFDM wireless communication system or an OFDMA wireless communication system), a preamble sequence having a small Peak to Average Power Ratio (PAPR) must be used.

The reason why the preamble sequence of the OFDM or the OFDMA wireless communication systems must have a small PAPR is as follows.

First, the OFDM wireless communication system is a multi-carrier communication system in which data is transmitted/received at high speed by using a plurality of sub-carriers, or sub-channels including at least one sub-carrier. Orthogonality between the respective sub-carriers is important. On that account, phases are set such that the sub-carriers have mutual orthogonality. Nevertheless, when the phases are changed during signal transmission/reception over the sub-carriers, signals may overlap between the sub-carriers. In this case, the amplitudes of the signals which overlap due to the phase change become out of synchronization with a linear interval of an amplifier provided in the OFDM wireless communication system, and thus it is impossible to normally transmit/receive the signals. For this reason, the OFDM wireless communication system uses a preamble sequence having a minimum PAPR.

In addition, the OFDM wireless communication system transmits data to many users, that is, many MSs by multiplexing one frame with respect to time. In the OFDM wireless communication system, a frame preamble indicating the start of the frames is also transmitted for a certain period from the starting point of the frames. Furthermore, since data to be transmitted to the respective users may be irregularly transmitted within one frame, a burst preamble indicating the start of the data exists in the front of the respective data. Thus, the MS must receive the data preamble in order to determine the starting point of the data transmission. That is, the MS requires synchronization with respect to the starting point of the data transmission in order to receive the data. To this end, the MS must adjust the synchronization by seizing a preamble sequence, which is used in common in all systems, before receiving the signals.

FIG. 1 is a diagram illustrating a downlink frame structure of a wireless communication system employing an ordinary OFDMA scheme.

Referring to FIG. 1, the down frame includes a preamble section 102, a section 104 consisting of a Frame Control Header (FCH), a DownLink Map (DL-MAP) and an UpLink Map (UL-MAP), and data transmission sections 106, 108, 110, 112. DL-MAP is a term used in IEEE 802.16 networks to define the usage of the downlink intervals for a burst mode PHY (Physical Layer), and UL-MAP is a term used to describe a MAC (Medium Access Control) message that defines burst start times for both time division multiplex and time division multiple access by a subscriber station on the uplink.

A synchronization signal for acquiring mutual synchronization between the BS and the MS, that is, a preamble sequence, is transmitted through the preamble section 102. In the FCH and DL/UL-MAP section 104, the FCH includes a location of the DL/UL-MAP and information on a sub-channel configuration method for data transmission in the subsequent downlink frame periods, a channel coding method and so forth. Therefore, the MS cannot acquire information on subsequently transmitted symbols before decoding the FCH. Also, the DL/UL section includes broadcasting control information.

The data transmission sections 106, 108, 110, 112, which are illustrated by way of example, may be divided into a Partial Usage of Sub-Channels (PUSC) zone 106, a Full Usage of Sub-Channels (FUSC) zone 108, an optional FUSC zone 110, and an Adaptive Modulation and Coding (AMC) zone 112. The respective data transmission sections 106, 108, 110, 112 can be distinguished from each other on the same frame by time division.

A brief discussion about the respective data transmission sections is as follows.

First, the PUSC zone will be described. The PUSC zone is a data burst section in which sub-channels are configured using a PUSC scheme. In other words, the PUSC scheme is a sub-channel configuration scheme in which only partial sub-channels of all of the sub-channels are assigned and used on a sector by sector basis, and the frequency reuse rate is above 1. Thus, by assigning different PUSC sub-channels from each other to sectors of two neighboring cells, mutual interferences between the sectors can be removed.

Secondly, the FUSC zone will be described. The FUSC zone is a data burst section in which sub-channels are configured using a FUSC scheme. In other words, the FUSC scheme is a sub-channel configuration scheme in which all of the sub-channels are assigned to and used in all sectors of all cells, and the frequency reuse rate is 1. In the FUSC scheme, all of the sub-channels may be used in all the sectors, but the sub-carriers constituting the sub-channels are set differently from sector to sector in order to minimize sub-channel interferences between the sectors. That is, the FUSC sub-channels are designed such that hit probabilities between sub-carriers constituting the sub-channels are minimized.

Thirdly, the optional FUSC zone will be described. Similar to the FUSC zone, the optional FUSC zone uses the FUSC scheme, but a mathematical equation for configuring sub-channels is different from that of the FUSC zone. Lastly, the AMC zone will be described. The AMC zone employs a scheme in which the entire frequency band is divided into specific frequency bands, and the specific frequency bands are adaptively assigned to the MSs while different modulation and coding methods are applied according to the divided frequency bands.

Sub-channel coding methods include the following four scheme: a Convolutional Coding (CC) scheme, a Convolutional Turbo Coding (CTC) scheme, a Block Turbo Coding (BTC) scheme and a Zero Tail Convolutional Coding (ZTCC) scheme.

As stated above, in order to transmit data, it is required to adjust synchronization between the BS and MS by use of the preamble, and decode the FCH and DL/UL-MAP section. As an example, in the IEEE (Institute of Electrical and Electronics Engineers) 802.16 communication system, it is prescribed that synchronization between a BS and an MS is adjusted first, a FCH and a DL/UL-MAP are decoded, and then a specific one of the above-mentioned operation modes for data transmission is selected for the data transmission. According to the current standards of the IEEE 802.16, it is a prerequisite that the PUSC scheme should be employed as a sub-channelization method for use in initial operation mode determination, and the CC scheme should be used as a sub-channel coding method.

However, placing restriction on selecting the initial operating mode, that is, a limit to using specific schemes as stated above, has acted as an inefficient factor in system design and administration. This is because there may occur a situation where operators or developers cannot use sub-channelization and sub-channel coding methods for initial operation mode determination, which are prescribed as an essential condition for a specific system. In this situation, there is a problem in that the above-mentioned restriction on initial operating mode ultimately causes an unnecessary waste of resources in the current wireless access communication system.

SUMMARY OF THE INVENTION

There is a necessity not to restrict an initial operating mode to a specific operation mode in a wireless communication system. Therefore, due to the above-mentioned restriction, there is a need to design a preamble for determining and detecting an initial operating mode, which provides efficient channel estimation and synchronization acquisition in system development and administration.

Accordingly, the present invention has been made to solve at least the above-mentioned problems occurring in the prior art, and an object of the present invention is to provide a method for selectively determining and detecting an initial operating mode in an OFDMA wireless communication system.

In order to accomplish this object, in accordance with a first aspect of the present invention, there is provided a method for detecting an initial operating mode in an OFDMA wireless communication system, the method includes receiving from a BS a reference signal having a specific pattern; and detecting an initial operating mode according to the received reference signal.

In order to accomplish the above-mentioned object, in accordance with a second aspect of the present invention, there is provided a method for selectively determining and detecting an initial operating mode in an OFDMA wireless communication system, the method includes generating a reference signal corresponding to a predetermined initial operating mode and receiving from a BS a reference signal, which has a specific pattern as presented below in Table 1,

TABLE 1

| FFT size | Sequence No. | Sequence | PAPR (dB) |
|---|---|---|---|
| 1024 | 0 | 473A0B21CE9537F3A0B20316AC873A0B 21CE95378C5F4DFCE9537F3A0B21CE953 7F3A0B20316AC80C5F4DE316AC873A0B 20316AC800 | 3.32 |
| | 1 | 126F5E749BC062A6F5E75643F9D26F5E74 9BC062D90A18A9BC062A6F5E749BC062 A6F5E75643F9D590A18B643F9D26F5E75 643F9D50 | 3.32 |
| | 2 | D04D5A3013417384D5A31ECBE8C7B2A5 CFECBE8C04D5A31ECBE8C04D5A30134 17384D5A31ECBE8C04D5A30134173FB2 A5CE13417398 | 3.37 |
| | 3 | 85180F65461426D180F64B9EBD92E7F09A B9EBD95180F64B9EBD95180F65461426D 180F64B9EBD95180F65461426AE7F09B46 1426C8 | 3.37 | in case of a Fast Fourier Transform (FFT) size of 1024; and detecting an initial operating mode according to the received reference signal.

In order to accomplish the above-mentioned object, in accordance with a third aspect of the present invention, there is provided a method for selectively determining and detecting an initial operating mode in an OFDMA wireless communication system, the method includes generating a reference signal corresponding to a predetermined initial operating mode and receiving from a BS a reference signal, which has a specific pattern as presented below in Table 2,

TABLE 2

| FFT size | Sequence No. | Sequence | PAPR (dB) |
|---|---|---|---|
| 512 | 0 | 5642862D90FE75642862A6F018B642862D 90FE749BD79D590FE740 | 3.17 |
| | 1 | 0317D378C5AB20317D37F3A54DE317D37 8C5AB21CE82C80C5AB210 | 3.17 |
| | 2 | 74603D9518509AB9FC26D18509AB9FC26 AE7AF64B9FC26D18509A8 | 3.21 |
| | 3 | 213568C04D05CFECA97384D05CFECA97 3FB2FA31ECA97384D05CF8 | 3.21 | in case of a FT size of 512; and detecting an initial operating mode according to the received reference signal.

In order to accomplish the above-mentioned object, in accordance with a fourth aspect of the present invention, there is provided a method for selectively determining and detecting an initial operating mode in an OFDMA wireless communication system, the method includes generating a reference signal corresponding to a predetermined initial operating mode and receiving from a BS a reference signal, which has a specific pattern as presented below in Table 3,

TABLE 3

| FFT size | Sequence No. | Sequence | PAPR (dB) |
| --- | --- | --- | --- |
| 128 | 0 | 590A18B643F9D0 | 2.89 |
|  | 1 | 0C5F4DE316AC80 | 2.89 |
|  | 2 | 518509AB9FC268 | 2.95 |
|  | 3 | 04D05CFECA9738 | 2.95 | in case of a FFT size of 128; and detecting an initial operating mode according to the received reference signal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
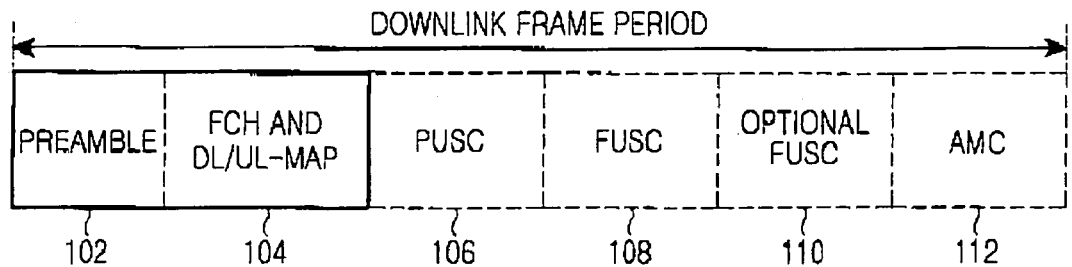
FIG. 1 is a diagram illustrating a downlink frame structure of a wireless communication system employing an ordinary OFDMA scheme.

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

The present invention proposes a method for selectively determining and detecting an initial operating mode between a Base Station (BS) and a Mobile Station (MS) in an Orthogonal Frequency Division Multiple Access (OFDMA) wireless communication system. The present invention proposes new preambles of a preamble section in a downlink frame structure. An operating mode corresponding to each of the newly proposed preambles may be determined as the initial operating mode. Here, the initial operating mode signifies a data transmission scheme or a sub-channel coding scheme, which will be used during a downlink frame period after the MS acquires synchronization with the BS. For example, an MS having received a first preamble may operate the initial operating mode in a PUSC scheme, and an MS having received a second preamble may operate the initial operating mode in a FUSC scheme. Also, an MS having received a third preamble may operate the initial operating mode in an optional FUSC scheme, and an MS having received a fourth preamble may operate the initial operating mode in an AMC scheme.

By the newly proposed preamble in the present invention, an initial operating mode including a data transmission scheme may be determined and detected, an initial operating mode including a channel coding scheme may be determined and detected, and an initial operating mode including both the data transmission scheme and the channel coding scheme may be determined and detected. For example, when 4 data transmission modes and 4 channel encoders exist in an initial operating mode, the number of possible combinations of the data transmission modes and the channel encoders is 16. Thus, by generating a first preamble to a sixteenth preamble and using them as preambles of a downlink frame, data transmission mode determination and channel coding can be performed according to system requirements between the BS and the MS.

Figure 2:
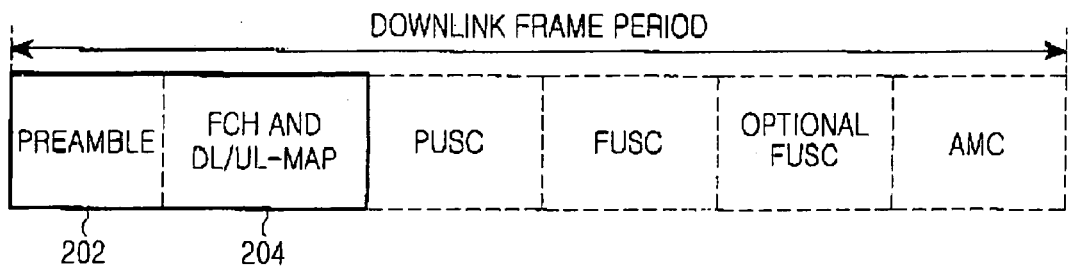
FIG. 2 is a diagram illustrating a downlink frame structure of an OFDMA wireless communication system in accordance with a preferred embodiment of the present invention.

FIG. 2 is a schematic view showing a downlink frame structure of an OFDMA wireless communication system in accordance with a preferred embodiment of the present invention.

Referring to FIG. 2, the downlink frame structure is almost the same as the common downlink frame structure shown in FIG. 1. However, the downlink frame structure according to the present invention differs from the common downlink frame structure in that preambles to be included in a preamble section 202 are different from the existing preambles and an FCH and DL/UL-MAP section 204 detects information by using the preambles according to the present invention. That is, although the existing preambles are used for synchronization acquisition, offset estimation and channel estimation, the preambles newly proposed in the present invention are not only used for the synchronization acquisition, the offset estimation and the channel estimation, but also enable a data transmission scheme or a channel coding scheme to be selectively determined and detected. Therefore, if the BS includes a specific preamble pattern in the preamble section and transmits a downlink frame including the specific preamble pattern to the MS, the MS selects one of the data transmission schemes or one of the channel coding schemes, which corresponds to the transmitted specific preamble pattern.

The newly proposed preambles according to the present invention will be described with reference to Tables 4 to 7.

Prior to the description, it is noted that preambles shown in Table 2 and Table 7 are designed on the assumption that there are 4 initial operating modes, and different preambles are represented according to the respective initial operating modes. The initial operating modes are distinguished from each other using preamble sequences determined according to the respective initial operation modes. On the other hand, different preamble sequences can also be generated in a cyclic shift scheme with respect to one preamble sequence to distinguish the respective initial operating modes from each other. The preamble sequences differently set according to the respective initial operating modes will be described by means of Tables 4 to 7. For the convenience of explanation, a description will be given for an initial operation mode for determining a data transmission scheme excluding a sub-channel coding scheme.

Table 4 represents sequence length according to Fast Fourier Transform (hereinafter referred to as 'FFT') sizes.

TABLE 4

|  | FFT size | | |
| --- | --- | --- | --- |
|  | 1024 | 512 | 128 |
| Sequence length | 432 | 216 | 54 |

Table 5 represents 4 different preamble sequences and PAPRs of the respective preamble sequences according to the FFT sizes in Table 4.

TABLE 5

| FFT size | Sequence No. | Sequence | PAPR (dB) |
|---|---|---|---|
| 1024 | 0 | DB09AB4602682E709AB463D97D18F654B9FD97D1809AB463D97D1809AB4602682E709AB463D97D1809AB4602682E7F654B9C2682E700 | 3.29 |
| | 1 | 00E7416439D2A6FE74164062D59018BE9BC62D590E74164062D59018BE9BC62D59018BE9BF9D2A6F18BE9BC62D590E74164062D590DB | 3.29 |
| | 2 | 71A301ECA8C284DA301EC973D7B25CFE13573D7B2A301EC973D7B2A301ECA8C284DA301EC973D7B2A301ECA8C284D5CFE1368C284DAA | 3.29 |
| | 3 | A4ADEBCE93780C54DEBCEAC87F3AB214316C87F3A4DEBCEAC87F3AB214316C87F3AB2143153780C5B214316C87F3A4DEBCEAC87F3A71 | 3.29 |
| 512 | 0 | 509AB46602682E709AB463D97D18F654B9FD97D1809AB463D97D18E | 3.23 |
| | 1 | 718BE9BC62D59018BE9BF9D2A6F18BE9BC62D590E74164062D590A | 3.23 |
| | 2 | FA301ECA8C284DA301EC973D7B25CFE13573D7B2A301EC973D7B24 | 3.23 |
| | 3 | DB214316C87F3AB2143153780C5B214316C87F3A4DEBCEAC87F3A0 | 3.23 |
| 128 | 0 | 04D05CFECA9738 | 3.07 |
| | 1 | 518509AB9FC26C | 3.07 |
| | 2 | 0C5F4DE316AC84 | 3.12 |
| | 3 | 590A18B643F9D0 | 3.12 |

Table 6 represents preamble sequence lengths in case of using preamble sequences having different lengths from those of the preamble sequences shown in Tables 4 and 5.

TABLE 6

| | FFT size | | |
|---|---|---|---|
| | 1024 | 512 | 128 |
| Sequence length | 425 | 213 | 53 |

Table 7 represents 4 different preamble sequences and PAPRs of the respective preamble sequences according to the FFT sizes in Table 6.

TABLE 7

| FFT size | Sequence No. | Sequence | PAPR (dB) |
|---|---|---|---|
| 1024 | 0 | 473A0B21CE9537F3A0B20316AC873A0B21CE95378C5F4DFCE9537F3A0B21CE9537F3A0B20316AC80C5F4DE316AC873A0B20316AC800 | 3.32 |
| | 1 | 126F5E749BC062A6F5E75643F9D26F5E749BC062D90A18A9BC062A6F5E749BC062A6F5E75643F9D590A18B643F9D26F5E75643F9D50 | 3.32 |
| | 2 | D04D5A3013417384D5A31ECBE8C7B2A5CFECBE8C04D5A31ECBE8C04D5A30134173FB2A5CE13417398 | 3.37 |
| | 3 | 85180F65461426D180F64B9EBD92E7F09AB9EBD95180F64B9EBD95180F65461426D180F64B9EBD95180F65461426AE7F09B461426C8 | 3.37 |
| 512 | 0 | 5642862D90FE75642862A6F018B642862D90FE749BD79D590FE740 | 3.17 |
| | 1 | 0317D378C5AB20317D37F3A54DE317D378C5AB21CE82C80C5AB210 | 3.17 |
| | 2 | 74603D9518509AB9FC26D18509AB9FC26AE7AF64B9FC26D18509A8 | 3.21 |

TABLE 7-continued

| FFT size | Sequence No. | Sequence | PAPR (dB) |
|---|---|---|---|
| | 3 | 213568C04D05CFECA97384D05CFECA973FB2FA31ECA97384D05CF8 | 3.21 |
| 128 | 0 | 590A18B643F9D0 | 2.89 |
| | 1 | 0C5F4DE316AC80 | 2.89 |
| | 2 | 518509AB9FC268 | 2.95 |
| | 3 | 04D05CFECA9738 | 2.95 |

If the preamble sequences shown in Tables 4 to 7 are those for determining the data transmission schemes of the initial operating mode, the data transmission schemes have only to correspond one-to-one to the respective preamble sequences. For example, an initial operating mode signifying a PUSC scheme corresponds to Sequence No. 0, an initial operating mode signifying an FUSC scheme corresponds to Sequence No. 1, an initial operating mode signifying an optional FUSC scheme corresponds to Sequence No. 2, and an initial operating mode signifying an AMC scheme corresponds to Sequence No. 3. If the MS detects a preamble sequence corresponding to the specific sequence number, it correspondingly determines the initial operating mode.

In the above description, different preamble sequences are generated according to the respective initial operating modes in order to distinguish the initial operating modes from each other. Henceforth, a description will be given for a scheme in which one reference preamble sequence is generated, processed by Inverse Fast Fourier Transform (IFFT) and cyclic-shifted in a time domain to generate other preamble sequences.

A reference preamble sequence is preset and generated correspondingly to the FFT size and the sequence length, and other preamble sequences are generated by differently cyclic-shifting the generated reference preamble sequence according to initial operating modes. In this way, preamble sequences according to the respective initial operating modes are generated. It is assumed that the generated preamble sequences are those for distinguishing data transmission modes of the initial operating mode, that is, data transmission modes of PUSC, FUSC, optional FUSC and AMC schemes, from each other. Then, the generated reference preamble sequence may be used as a first preamble sequence signifying the PUSC scheme. Also, a preamble sequence, which is generated by cyclic-shifting the first preamble sequence by ¼ of the FFT size in a time domain, may be used as a second preamble sequence signifying the FUSC scheme. Similarly, a preamble sequence, which is generated by cyclic-shifting the first preamble sequence by ¾ of the FFT size in a time domain, may be used as a third preamble sequence signifying the optional FUSC scheme. In the same way, a preamble sequence, which is generated by cyclic-shifting the first preamble sequence by ¾ of the FFT size in a time domain, may be used as a fourth preamble sequence signifying the AMC scheme.

In contrast with this, a wireless communication system incapable of selectively determining an initial operating mode can only predetermine one preamble sequence corresponding to the FFT size and the sequence length, and use it as a preamble of the downlink data frame.

A method by which the MS detects a specific preamble sequence may employ an auto-correlation technique in a time domain or in a frequency domain.

Figure 3:
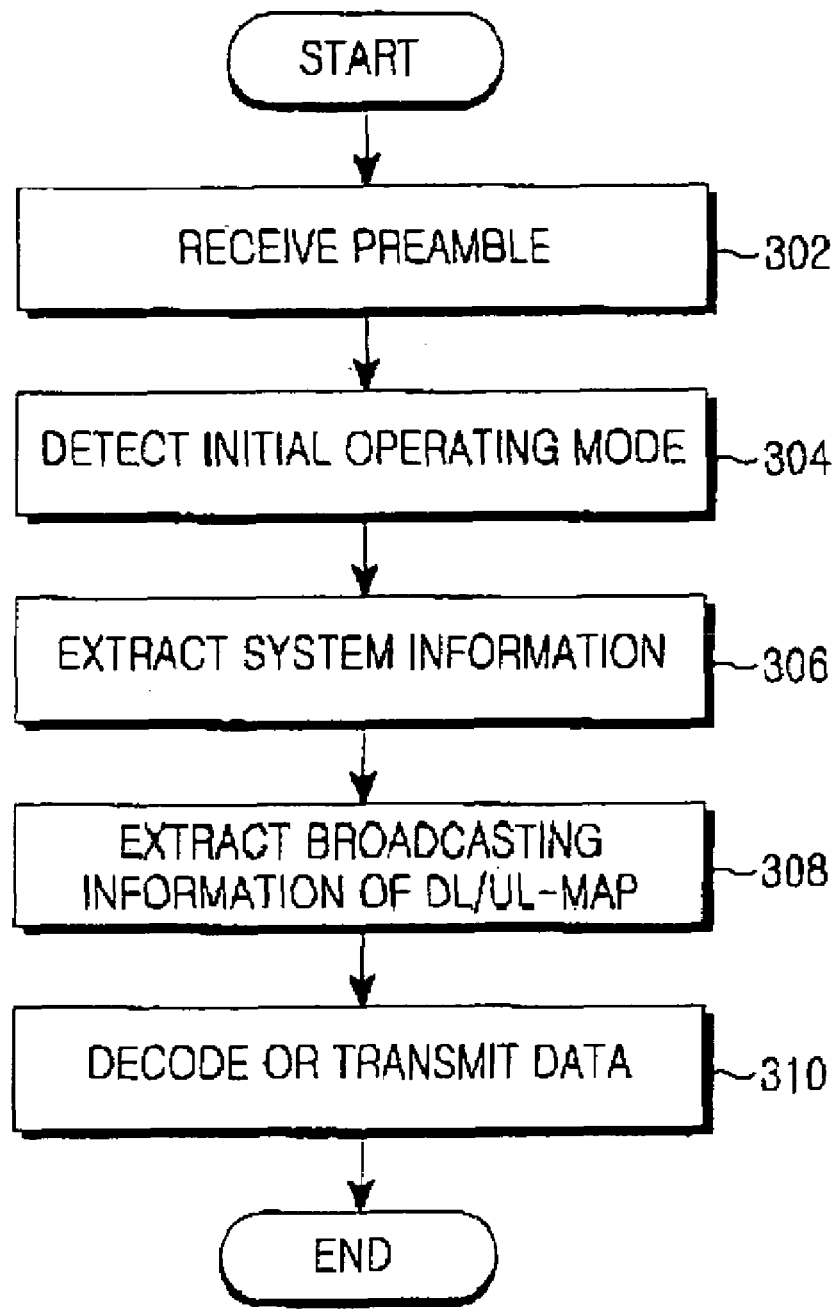
FIG. 3 is a flowchart showing data decoding and transmission procedures performed by an MS according to initial operating mode detection in an OFDMA wireless communication system in accordance with a preferred embodiment of the present invention.

FIG. 3 is a flowchart showing data decoding and transmission procedures performed by an MS according to initial operation mode detection in an OFDMA wireless communication system in accordance with a preferred embodiment of the present invention.

Referring to FIG. 3, in step 302, the MS receives from a BS a preamble corresponding to a specific preamble sequence number in Table 5 or 7, and then proceeds to step 304. In step 304, the MS detects an initial operating mode by using the received specific preamble, and then proceeds to step 306. In step 306, the MS demodulates and decodes an FCH according to the detected initial operating mode to extract related information, and then proceeds to step 308. In step 308, the MS extracts broadcasting information and data frame-related information assigned to a DL/UL-MAP, and then proceeds to step 310. In step 310, the MS decodes downlink data received for a downlink frame period or transmits data to the BS for an uplink frame period.

As describe above, the present invention proposes new preamble sequences for enabling an initial operating mode to be selectively determined, and thus an MS can selectively determine the initial operating mode according to the detection of the preamble sequence. Thus, the preamble sequences of the present invention can be applied to a system which does not fixedly operate, but flexibly operates the initial operating mode.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for acquiring synchronization in an Orthogonal Frequency Division Multiple Access (OFDMA) wireless communication system, the method comprising:
    generating and transmitting, in a transmitter, a first sequence for acquiring synchronization with a receiver;
    receiving the first sequence in the receiver; and
    acquiring synchronization with the transmitter by using the first sequence and a second sequence,
    wherein each of the first and second sequences is represented by, 473A0B21CE9537F3A0B20316AC873A0B21CE95378C5F4DFCE9537F3A0B21CE9537F3A0B20316AC80C5F4DE316AC873A0B20316AC800 when the receiver has a Fast Fourier Transform (FFT) size of 1024.

2. A method for acquiring synchronization in an Orthogonal Frequency Division Multiple Access (OFDMA) wireless communication system, the method comprising:
    generating and transmitting, in a transmitter, a first sequence for acquiring synchronization with a receiver;
    receiving the first sequence in the receiver; and
    acquiring synchronization with the transmitter by using the first sequence and a second sequence,
    wherein each of the first and second sequences is represented by,

5642862D90FE75642862A6F018B642862D90FE749BD79D590FE740 when the receiver has a Fast Fourier Transform (FFT) size of 512.

3. A method for acquiring synchronization in an Orthogonal Frequency Division Multiple Access (OFDMA) wireless communication system, the method comprising:
    generating and transmitting, in a transmitter, a first sequence for acquiring synchronization with a receiver;
    receiving the first sequence in the receiver; and
    acquiring synchronization with the transmitter by using the first sequence and a second sequence,
    wherein each of the first and second sequences are represented by,

590A18B643F9D0 when the receiver has a Fast Fourier Transform (FFT) size of 128.

4. A method for operating a transmitter in order to acquire synchronization in an Orthogonal Frequency Division Multiple Access (OFDMA) wireless communication system, the method comprising:
    generating a first sequence for acquiring synchronization with a receiver; and
    transmitting the first sequence to the receiver,
    wherein the first sequence is represented by, 473A0B21CE9537F3A0B20316AC873A0B21CE95378C5F4DFCE9537F3A0B21CE9537F3A0B20316AC80C5F4DE316AC873A0B20316AC800 when the receiver has a Fast Fourier Transform (FFT) size of 1024.

5. A method for operating a transmitter in order to acquire synchronization in an Orthogonal Frequency Division Multiple Access (OFDMA) wireless communication system, the method comprising:
    generating a first sequence for acquiring synchronization with a receiver; and
    transmitting the first sequence to the receiver,
    wherein the first sequences is represented by,

5642862D90FE75642862A6F018B642862D90FE749BD79D590FE740 when the receiver has a Fast Fourier Transform (FFT) size of 512.

6. A method for operating a transmitter in order to acquire synchronization in an Orthogonal Frequency Division Multiple Access (OFDMA) wireless communication system, the method comprising:
    generating a first sequence for acquiring synchronization with a receiver; and
    transmitting the first sequence to the receiver,
    wherein the first sequence is represented by,

590A18B643F9D0 when the receiver has a Fast Fourier Transform (FFT) size of 128.

7. A method for operating a receiver in order to acquire synchronization in an Orthogonal Frequency Division Multiple Access (OFDMA) wireless communication system, the method comprising:
    receiving a first sequence from a transmitter; and
    acquiring synchronization with the transmitter by using the first sequence and a second sequence wherein each of the first and second sequences is represented by, 473A0B21CE9537F3A0B20316AC873A0B21CE95378C5F4DFCE9537F3A0B21CE9537F3A0B20316AC80C5F4DE316AC873A0B20316AC800 when the receiver has a Fast Fourier Transform (FFT) size of 1024.

8. A method for operating a receiver in order to acquire synchronization in an Orthogonal Frequency Division Multiple Access (OFDMA) wireless communication system, the method comprising:
    receiving a first sequence from a transmitter; and
    acquiring synchronization with the transmitter by using the first sequence and a second sequence wherein each of the first and second sequences is represented by,

5642862D90FE75642862A6F018B642862D90FE749BD79D590FE740 in case where the receiver has a Fast Fourier Transform (FFT) size of 512.

9. A method for operating a receiver in order to acquire synchronization in an Orthogonal Frequency Division Multiple Access (OFDMA) wireless communication system, the method comprising:

receiving a first sequence from a transmitter; and acquiring synchronization with the transmitter by using the first sequence and a second sequence wherein each of the first and second sequences is represented by,

590A18B643F9D0 when the receiver has a Fast Fourier Transform (FFT) size of 128.

* * * * *